United States Patent
Jerolm

(10) Patent No.: US 11,411,710 B2
(45) Date of Patent: Aug. 9, 2022

(54) SUBSCRIBER OF A DATA NETWORK

(71) Applicant: WAGO Verwaltungsgesellschaft mbH, Minden (DE)

(72) Inventor: Daniel Jerolm, Bad Essen (DE)

(73) Assignee: WAGO Verwaltungsgesellschaft mbH, Minden (DE)

( * ) Notice: Subject to any disclaimer, the term of this patent is extended or adjusted under 35 U.S.C. 154(b) by 11 days.

(21) Appl. No.: 17/158,777

(22) Filed: Jan. 26, 2021

(65) Prior Publication Data

US 2021/0152325 A1 May 20, 2021

Related U.S. Application Data

(63) Continuation of application No. PCT/IB2019/055555, filed on Jul. 1, 2019.

(30) Foreign Application Priority Data

Jul. 26, 2018 (DE) .................... 10 2018 005 892.2

(51) Int. Cl.
*H04L 7/00* (2006.01)
*H04L 12/40* (2006.01)

(52) U.S. Cl.
CPC ............ *H04L 7/0016* (2013.01); *H04L 12/40* (2013.01)

(58) Field of Classification Search
None
See application file for complete search history.

(56) References Cited

U.S. PATENT DOCUMENTS

| 5,537,549 | A | 7/1996 | Gee et al. |
| 7,012,980 | B2 | 3/2006 | Franke et al. |
| 7,805,541 | B2 | 9/2010 | Zehentner |

(Continued)

FOREIGN PATENT DOCUMENTS

| DE | 102012108696 A1 | 3/2014 |
| EP | 0622712 A2 | 11/1994 |

(Continued)

OTHER PUBLICATIONS

International Search Report dated Dec. 4, 2019 in corresponding application PCT/IB2019/055555.

(Continued)

*Primary Examiner* — Abdelillah Elmejjarmi
(74) *Attorney, Agent, or Firm* — Muncy, Geissler, Olds & Lowe, P.C.

(57) ABSTRACT

A subscriber of a wired data network, in particular of a local bus system, having internal clock generator for generating a clock generator signal having a clock generator frequency for the subscriber, a receive circuit for receiving a serial receive data stream, a processing circuit for inputting parallel receive data and for outputting parallel transmit data, and a transmit circuit for transmitting a serial transmit data stream. The receive circuit has a serial-to-parallel converter for converting serial receive data of the serial receive data stream into the parallel receive data. The receive circuit has a synchronization unit for synchronizing the internal clock generator to the data clock frequency contained in the serial receive data stream. The synchronization unit is configured for detecting transitions in the received serial receive data stream and for controlling the clock generator frequency of the internal clock generator as a function of the detected transitions.

15 Claims, 3 Drawing Sheets

(56) References Cited

U.S. PATENT DOCUMENTS

| 9,436,212 | B2 | 9/2016 | Jerolm |
| 2012/0008727 | A1 | 1/2012 | Mohaieri et al. |
| 2014/0281656 | A1 | 9/2014 | Ruesch et al. |

FOREIGN PATENT DOCUMENTS

| EP | 1653651 | A2 | 5/2006 |
| EP | 1368728 | B1 | 1/2010 |

OTHER PUBLICATIONS

Aweya, James: "Implementing Synchronous Ethernet in Telecommunication Systems" IEEE Communications Surveys & Tutorials vol. 16, No. 2, Apr. 1, 2014, pp. 1080-1113, DOI: 10.1109/SURV.2013.103113.00260 ,XP011547644.

Webb, Chip: "A Layered Model for Error Sources in Boundary Clocks with Physical Layer Assist—Part 1" WD23, ITU-T Draft, Study Period: 2009-2012, International Telecommunication Union, vol. 13/15, Sep. 12, 2011, pp. 1-10, XP044041418.

"HFTA-07.0: Precision Reference Clock Usage in Clock and Data Recovery Curcuits", www.maximintegrated.com/en/app-notes/index.mvp/id/1925 , Mar. 13, 2003.

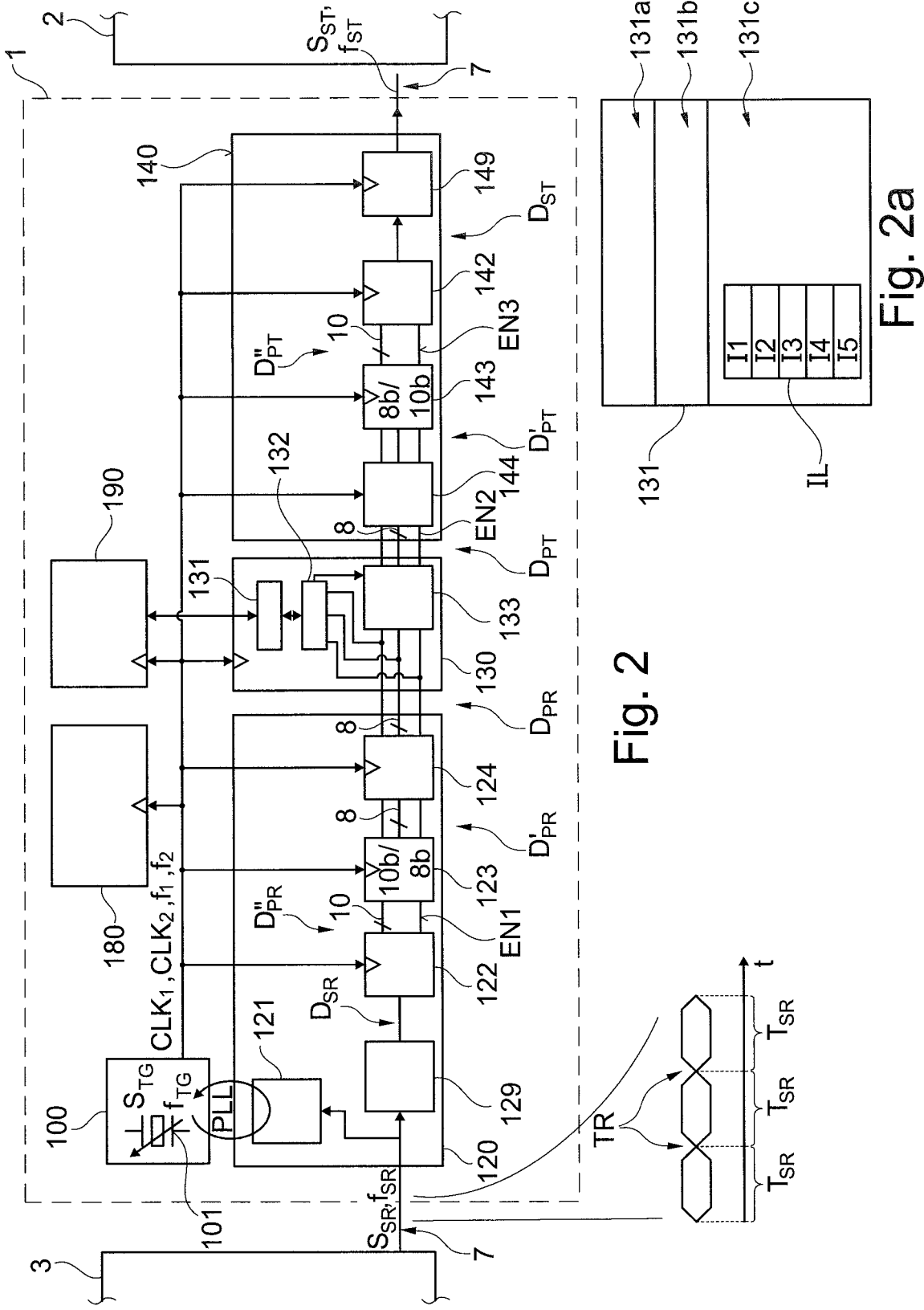

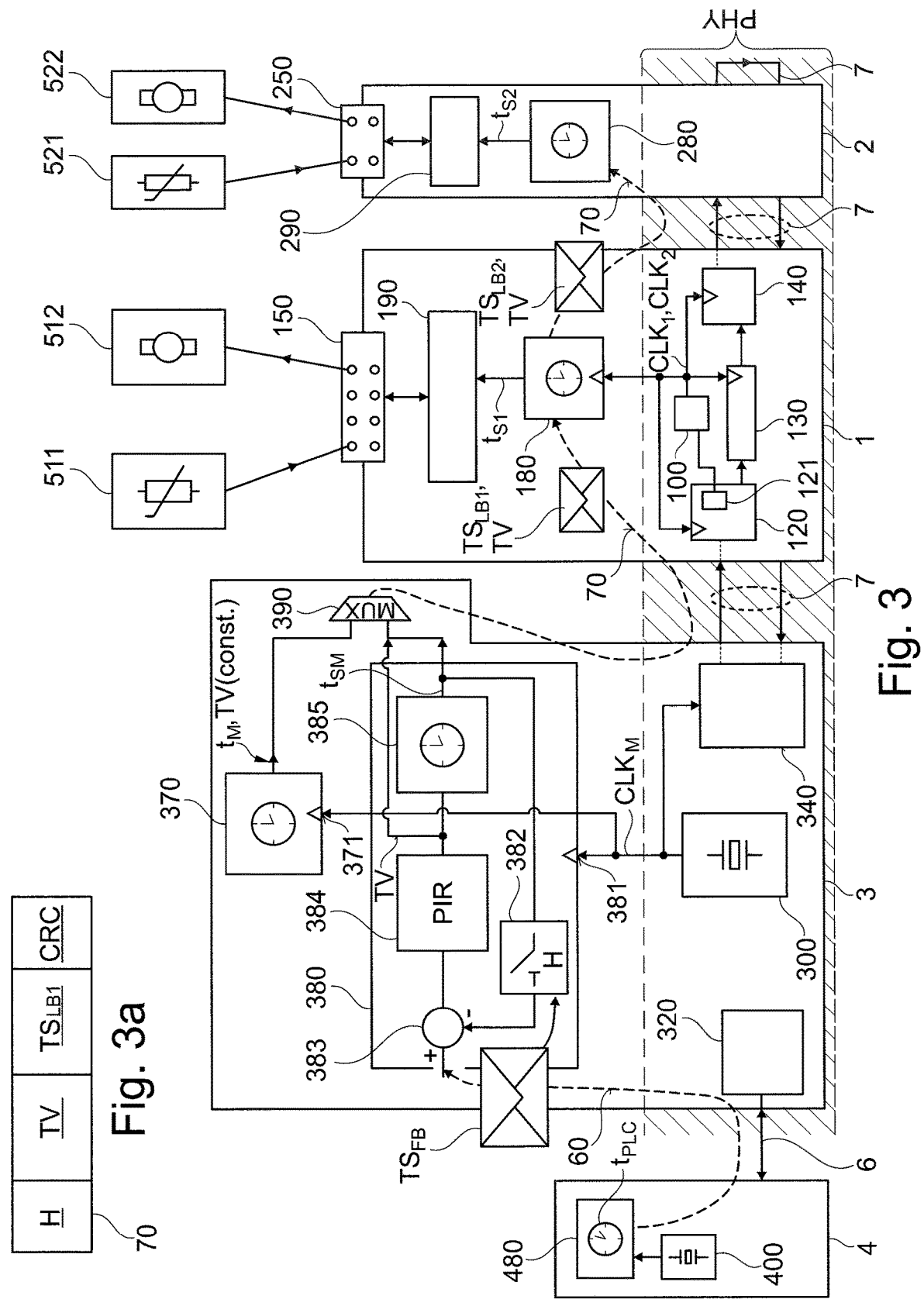

SUBSCRIBER OF A DATA NETWORK

This nonprovisional application is a continuation of International Application No. PCT/IB2019/055555, which was filed on Jul. 1, 2019, and which claims priority to German Patent Application No. DE 10 2018 005 892.2, which was filed in Germany on Jul. 26, 2018 and which are both herein incorporated by reference.

BACKGROUND OF THE INVENTION

Field of the Invention

The present invention relates to a subscriber in a wired data network, in particular a subscriber of a local bus system.

Description of the Background Art

A synchronous, clocked communication system with a relative clock and method for configuring such a system is known from EP 1 368 728 B1, which corresponds to U.S. Pat. No. 7,012,980. In order to ensure the clock synchronous data exchange, continuous resynchronization of the stations takes place during active operation. The duration of a communication cycle is between 10 μs and 10 ms.

A clock recovery circuit is known from US 2012/0008727 A1. Clock recovery includes data transfer speeds between 1 to 30 Gbps or higher. A clock recovery is also known from "HFTA-07.0: Precision Reference Clock Usage in Clock and Data Recovery Circuits," www.maximintegrated.com, Mar. 13, 2003.

A data bus subscriber with a data bus interface is known is known from DE 10 2012 108 696 A1, which corresponds to U.S. Pat. No. 9,436,212, which is incorporated herein by reference, and which has a downstream data bus input for receiving data from a higher-order data bus subscriber and a clock generator for generating an internal clock signal for the data bus subscriber. The data bus subscriber has a synchronization unit for synchronizing the clock generator to the clock signal of the higher-order data bus subscriber, wherein the synchronization unit is configured to detect transitions in the downstream data stream received at the downstream data bus input. The synchronization unit is configured to regulate the frequency of the internal clock signal depending on the detected transitions and to set a defined phasing of the internal clock signal in relation to the detected transitions.

SUMMARY OF THE INVENTION

It is therefore an object of the present invention to provide a wired data network subscriber that is as improved as possible.

Accordingly, a subscriber of a wired data network is provided. The wired data network is in particular a local bus system. A wired data network enables the transmission of data, for example, via electrically and/or optically conductive connections. A local bus system can be connected to a higher-level fieldbus system via a coupler.

The subscriber has an internal clock generator for generating a clock generator signal having a clock generator frequency for the subscriber. An internal clock generator is to be understood in this case in the sense of at least one internal clock generator, wherein the subscriber can have a plurality of clock generators that generate a different clock generator signal and/or a different clock generator frequency. The internal clock generator is disposed in the subscriber itself. For example, the internal clock generator is a component of a subscriber's circuit. The clock generator signal is a signal that can provide a clock cycle to circuit parts of the subscriber. The clock generator signal is, for example, a digital square wave signal with a high edge steepness and low jitter.

The subscriber has a receive circuit for receiving a serial receive data stream. A receive circuit in this case is to be understood in the sense of at least one receive circuit; for example, a subscriber with two bus connections can require at least two receive circuits. Accordingly, a serial receive data stream in this case is to be understood in the sense of at least one serial receive data stream. A serial receive data stream is part of a serial data transmission. Using serial data transmission, digital data can be transmitted autonomously on one or more line pairs. The serial receive data stream can take place, for example, as a bit-serial data transmission, wherein one or more lines can be used in parallel. To transmit the serial receive data stream, the data can be modulated in a complex manner, wherein the signals generated by modulation no longer recognize individual bits, e.g., QAM4 or QAM64.

The subscriber has a processing circuit for inputting parallel receive data and for outputting parallel transmit data. A processing circuit in this case is to be understood in the sense of at least one processing circuit; for example, two receive circuits can be assigned to different processing circuits. The processing circuit is advantageously designed to input a fixed number of bits as parallel receive data, for example, 8 bits. According to an advantageous refinement, the specific number of parallel bits of the parallel receive data and the parallel transmit data is the same.

The subscriber has a transmit circuit for transmitting a serial transmit data stream. A transmit circuit in this case is to be understood in the sense of at least one transmit circuit; for example, the subscriber can have two bus connections for transmission from two different further subscribers, wherein each bus connection can be associated with a transmit circuit. Accordingly, a serial transmit data stream in this case is to be understood in the sense of at least one serial transmit data stream. A serial transmit data stream is part of a serial data transmission. Using serial data transmission, digital data can be transmitted autonomously on one or more line pairs. The serial transmit data stream can take place, for example, as a bit-serial data transmission, wherein one or more lines can be used in parallel. To transmit the serial transmit data stream, the data can be modulated in a complex manner, wherein the signals generated by modulation no longer recognize individual bits, e.g., QAM4 or QAM64.

The receive circuit can have a serial-to-parallel converter for converting serial receive data of the serial receive data stream into the parallel receive data. A serial-to-parallel converter in this case is to be understood in the sense of at least one serial-to-parallel converter; for example, two serial-to-parallel converters can convert the data in parallel with two pairs of lines for serial transmission. A serial-to-parallel converter advantageously has at least one input for the serial receive data and parallel outputs for the parallel receive data and is designed to convert the serial receive data into parallel receive data. For example, the serial-to-parallel converter has digital memory cells and is designed as a register, in particular as a shift register.

The receive circuit can have a synchronization unit for synchronizing the internal clock generator to the data clock frequency contained in the serial receive data stream. A synchronization unit in this case is to be understood in the sense of at least one synchronization unit. The synchronization unit is preferably a circuit. The synchronization unit is integrated, for example, on a semiconductor chip, for example, together with at least parts of the clock generator. The synchronization has, for example, a frequency synchronization, wherein the clock generator frequency of the internal clock generator is automatically adapted. According to refinements of the invention, the synchronization can comprise one or more additional further synchronizations, for example, a phase synchronization or amplitude synchronization. Because the data clock frequency is contained in the serial receive data stream, it can exist, for example, implicitly as information in the receive data stream; for example, the smallest period between two transitions is a reciprocal of the data clock frequency. Accordingly, no explicitly transmitted frequency value is required for the synchronization. The synchronization unit is preferably configured for detecting transitions in the received serial receive data stream and for controlling the clock generator frequency of the internal clock generator as a function of the detected transitions. For example, transitions in the bit-serial signal are signal edges between low and high. For example, transitions in the modulated data stream are transitions between modulation states. For example, in the case of QAM4 there are four states between which transitions can be detected.

The transmit circuit can have a parallel-to-serial converter for converting the parallel transmit data into serial transmit data of the transmit data stream. A parallel-to-serial converter in this case is to be understood in the sense of at least one parallel-to-serial converter; for example, two parallel-to-serial converters can convert the data in parallel for two pairs of lines of the serial transmission. The parallel-to-serial converter advantageously has at least one output for the serial transmit data and parallel inputs for the parallel transmit data and is designed to convert the parallel transmit data into serial transmit data. For example, the parallel-to-serial converter has digital memory cells and is designed as a register, in particular as a shift register.

The internal clock generator can be configured for outputting a first clock signal derived from the clock generator signal to the transmit circuit, so that the conversion of the parallel transmit data into serial transmit data for the serial transmit data stream is clocked by the first clock signal. According to an advantageous refinement of the invention, the internal clock generator has a clock output for outputting the first clock signal and the transmit circuit has a clock input for inputting the first clock signal.

A first clock frequency of the first clock signal can be equal to the data clock frequency contained in the serial receive data stream by closed-loop control. According to an advantageous refinement of the invention, minimal differences between an actual frequency value and a desired frequency value are controlled to zero by closed-loop control.

The clock generator can be configured for outputting a second clock signal derived from the clock generator signal to the processing circuit, so that processing of the parallel receive data and/or the parallel transmit data is clocked by the second clock signal. In this regard, the first clock signal and the second clock signal can be different or the same. In addition, in other refinements of the invention it is possible for the clock generator to output a third clock signal or further clock signals. According to an advantageous refinement of the invention, the processing circuit has a clock input for inputting the second clock signal.

For the processing, the processing circuit can be configured to forward the parallel receive data. The forwarding advantageously takes place without the intermediate storage of entire data packets. The processing circuit is preferably configured to output the parallel transmit data based on the parallel receive data to the transmit circuit after a predetermined number of cycles of the second clock signal. The predetermined number of cycles is preferably less than twenty cycles, for example, only two cycles. For example, the parallel receive data are changed in the sense of first-in-first-out by the subscriber by means of the processing circuit or forwarded unchanged. For example, successive data from one and the same data packet can be received and sent at the same time when forwarded by the subscriber.

Also, for the processing, the processing circuit can be additionally configured to store the parallel receive data at least partially in a memory area for evaluation and/or to read out the parallel transmit data at least partially from a memory area in order to output the read-out parallel transmit data to the transmit circuit and/or to change a number of bit values of the parallel receive data in order to output the parallel receive data with the change as parallel transmit data to the transmit circuit. A memory area in this case is to be understood in the sense of at least one memory area. The memory is advantageously disposed in the subscriber or at least accessible by the subscriber.

The clock generator can be configured to output the second clock signal having a second clock frequency. By close-loop control, the second clock frequency is equal to or an integer multiple or an integer fraction of the data clock frequency contained in the serial receive data stream.

By closed-loop control, the clock generator frequency of the clock generator can be equal to or an integer fraction or an integer multiple of the data clock frequency contained in the serial receive data stream.

The processing circuit can have a memory area for an instruction list. An instruction list in this case is to be understood in the sense of at least one instruction list. The processing circuit is configured to execute the processing based on instructions contained in the instruction list. The processing circuit is configured to clock a reading out of the instructions from the instruction list by means of the second clock signal.

The clock generator can have at least one crystal oscillator having a voltage-trimmable clock generator frequency. The crystal oscillator is advantageously part of at least one phase-locked loop.

The clock generator frequency of the clock generator can be adjustable only within a range of less than 1% of the clock generator frequency, in particular less than 200 ppm of the clock generator frequency.

The receive circuit can have a decoder for decoding the parallel receive data. A decoder in this case is to be understood in the sense of at least one decoder. The decoder is advantageously clocked by the first clock signal. According to an advantageous refinement of the invention, the transmit circuit has an encoder for encoding the parallel transmit data. An encoder in this case is to be understood in the sense of at least one encoder. The encoder is advantageously clocked by the first clock signal.

The receive circuit can have a descrambler for descrambling the parallel receive data. A descrambler in this case is to be understood in the sense of at least one descrambler. The descrambler is preferably clocked by the first clock signal. According to an advantageous refinement of the invention, the transmit circuit has a scrambler for scrambling the parallel transmit data. A scrambler in this case is to be understood in the sense of at least one scrambler. The scrambler is advantageously clocked by the first clock signal.

The processing circuit can be configured to output the parallel transmit data after a predetermined number of cycles of the second clock signal after the inputting of the parallel receive data.

The subscriber can have a clock circuit for outputting a clock time. A clock circuit in this case is to be understood in the sense of at least one clock circuit. Accordingly, a clock time is to be understood in the sense of at least one clock time.

A clock cycle of the clock circuit can be derived from the clock generator signal having the clock generator frequency. The clock circuit is advantageously connected to a clock output of the clock generator. By closed-loop control, the clock cycle is advantageously equal to or a fraction or a multiple of the data clock frequency contained in the serial receive data stream. In principle, it is possible for the clock cycle to be a non-integer fraction or a non-integer multiple of the data clock frequency. By closed-loop control, however, the clock cycle is preferably an integer fraction or an integer multiple of the data clock frequency contained in the serial receive data stream.

The processing circuit can be configured for synchronizing the clock time. In this regard, the processing circuit is configured to evaluate a time value from the parallel receive data and to set the clock time of the clock circuit based on the time value. The clock time of the clock circuit can also be based on a known or determined number of cycles of the clock generator that are required to receive and/or evaluate the parallel receive data and/or to set the clock time. For example, the clock time of the subscriber's clock circuit can be synchronized to a reference time of another subscriber, wherein the time value is received from the further subscriber.

The processing circuit can be configured to evaluate a time increment value from the parallel receive data and to set a clock time increment of the clock circuit based on the time increment value. For example, the clock speed can be determined by the clock time increment.

The clock circuit can be designed such that the clock time is not controlled by a clock time controller of the clock circuit.

The processing circuit can be configured to determine a current time value and/or a current time increment value from the clock circuit and to write it into the parallel transmit data. For writing the current time value, the processing circuit is preferably configured to generate the received time value by incrementing bits of the received time value. In this regard, the bits are incremented when the received time value is passed through and sent as the current time value. Due to the pass-through, the receiving of the time value and the sending of the current time value take place partially simultaneously. It is therefore preferably not necessary to first receive the time value in full and to temporarily store it in order to generate and send the current time value. The current time value is preferably the sum of the received time value and a time delta of a known or determined transmission delay by the subscriber. Accordingly, a subsequent subscriber who receives the current time value can synchronize to the clock time of the previous subscriber by means of the current time value Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 is a schematic representation of a subscriber of a wired network of another exemplary embodiment;

FIG. 2a is a schematic representation of memory areas of a memory;

FIG. 3 is a schematic representation of an exemplary embodiment of a system with a local bus and a higher-level bus; and FIG. 3a is a schematic representation of a data packet.

DETAILED DESCRIPTION

Figure 1:
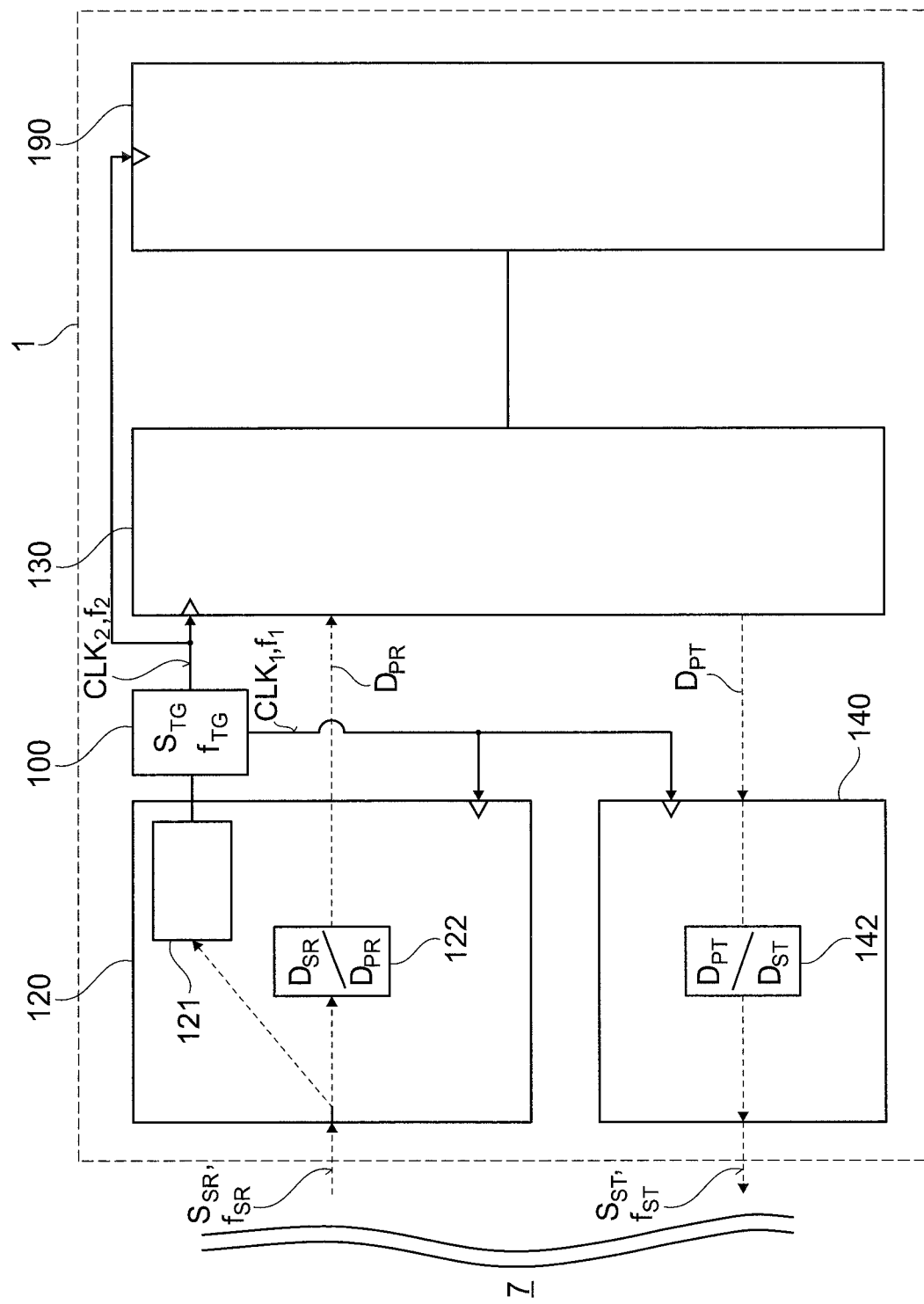
FIG. 1 is a schematic representation of a subscriber of a wired network of an exemplary embodiment.

A subscriber 1 of a wired data network 7 is shown schematically in FIG. 1. In the exemplary embodiment of FIG. 1, data network 7 is designed for serial data transmission. In a serial data transmission, data are transmitted autonomously on one line or a number of line pairs. In a serial transmission, there is no need to take into account transit time differences between different lines, so that higher transmission frequencies are made possible. In a simple case, serial data transmission can be designed as a bit-serial data transmission, wherein in serial data transmissions multiple lines can be used in parallel, such as, e.g., in the case of gigabit Ethernet or HDMI. Complex modulations, such as, e.g., QAM16, QAM64, or the like, which no longer recognize individual bits (e.g., PCI Express, USB 3.x, etc.) can also be used for serial data transmission. Different serial interfaces, connectors, voltages, modulations, protocols, and software interfaces are defined depending on the serial data transmission.

The exemplary embodiment in FIG. 1 shows subscriber 1 of wired data network 7 in a greatly simplified block diagram. The invention is not restricted to exactly one subscriber; a large number of subscribers can usually be connected to one another in a wired data network 7.

Subscriber 1 has an internal clock generator 100 for generating a clock generator signal STG having a clock generator frequency $f_{TG}$ for subscriber 1. In the embodiment of FIG. 1, the clock generator frequency $f_{TG}$ is adjustable by a synchronization unit 121 within a frequency range. For this purpose, internal clock generator 100 is connected to synchronization unit 121.

Subscriber 1 of the exemplary embodiment in FIG. 1 has a receive circuit 120 for receiving a serial receive data stream $S_{SR}$ from wired data network 7. The serial receive data stream $S_{SR}$ in the simplest case consists of a sequence of zeros and ones on one or more serial lines. Likewise, in the exemplary embodiment in FIG. 1, it is also possible to use modulation methods for the serial transmission of the serial receive data stream $S_{SR}$ (not shown in FIG. 1).

Subscriber 1 of the exemplary embodiment in FIG. 1 also has a processing circuit 130 for inputting parallel receive data $D_{PR}$ and for outputting parallel transmit data $D_{PT}$. In the exemplary embodiment in FIG. 1, processing circuit 130 is formed by digital logic. It is possible to form the digital logic by a programmable processor; the digital logic of processing circuit 130 is preferably formed by hard-wired logic elements so that processing circuit 130 itself does not have any software for processing. Processing circuit 130 is connected to receive circuit 120 so that the parallel receive data $D_{PR}$ can reach processing circuit 130 from receive circuit 120.

Subscriber 1 of the exemplary embodiment in FIG. 1 additionally has a transmit circuit 140 for sending a serial transmit data stream $S_{ST}$ on wired data network 7. The serial transmit data stream $S_{ST}$ in the simplest case consists of a sequence of zeros and ones on one or more serial lines of wired data network 7. Likewise, in the exemplary embodiment in FIG. 1, it is also possible to use modulation methods for the serial transmission of the serial transmit data stream $S_{ST}$ (not shown in FIG. 1). Processing circuit 130 is connected to transmit circuit 140 so that parallel transmit data $D_{PT}$ can reach transmit circuit 140 from processing circuit 130.

Receive circuit 120 of subscriber 1 of the exemplary embodiment in FIG. 1 has a serial-to-parallel converter 122 for converting serial receive data $D_{SR}$ into parallel receive data $D_{PR}$. The serial receive data $D_{SR}$ in this case are contained in the serial receive data stream $S_{SR}$ on wired data network 7. In a particularly simple embodiment of serial-to-parallel converter 122, this is designed as a shift register, wherein the serial receive data $D_{SR}$ are present at the serial input of the shift register and the parallel receive data $D_{PR}$ are output at the parallel outputs of the shift register (not shown in FIG. 1).

Receive circuit 120 of subscriber 1 of the exemplary embodiment in FIG. 1 also has synchronization unit 121 for synchronizing internal clock generator 100. Synchronization unit 121 in this case is designed for synchronizing internal clock generator 100, in particular its clock generator frequency $f_{TG}$, to the data clock frequency $f_{SR}$ contained in the serial receive data stream $S_{SR}$. The data clock frequency in this case is dependent on the spacing of transitions between successive different values, e.g., low and high of the serial receive data stream $S_{SR}$. The data clock frequency $f_{SR}$ contained in the serial receive data stream $S_{SR}$ corresponds here to a clock frequency with which a transmitter (not shown in FIG. 1) connected via wired data network 7 clocks the data stream $S_{SR}$. Subscriber 1 in the exemplary embodiment in FIG. 1 is configured to synchronize using the data clock frequency $f_{SR}$ to a clock frequency of the transmitter connected via wired data network 7, so that the clock generator frequency $f_{TG}$ follows the data clock frequency $f_{SR}$ precisely and with little delay. In this regard, synchronization unit 121 is configured for detecting the transitions in the received serial receive data stream $S_{SR}$ and for controlling the clock generator frequency $f_{TG}$ of internal clock generator 100 as a function of the detected transitions. In addition to the serial-to-parallel converter 122 and synchronization unit 121 shown in the embodiment example of FIG. 1, receive circuit 120 has multiple other subcircuits for the function of receiving the serial data stream $S_{SR}$ and other functions which are not shown in FIG. 1 for simplified understanding.

Transmit circuit 140 of subscriber 1 of the exemplary embodiment in FIG. 1 has a parallel-to-serial converter 142 for converting the parallel transmit data $D_{PT}$ into serial transmit data $D_{ST}$ of the transmit data stream SST. The serial transmit data $D_{ST}$ are transmitted in the serial transmit data stream $S_{ST}$ to another subscriber (not shown in FIG. 1) in wired data network 7. Transmit circuit 140 of subscriber 1 of the exemplary embodiment in FIG. 1 is shown in a greatly simplified manner here and preferably has additional sub-circuits for the functions of the transmit circuit 140, such as, for example, encoding circuit, modulation circuit, amplifier circuit, or the like, which are not shown in FIG. 1 for easy understanding. Transmit circuit 140 and receive circuit 120 can be connected to different further subscribers. It is also possible for transmit circuit 140 and receive circuit 120 to be connected, for example, for a duplex connection, to the same subscriber or, for example, via a switch to a number of further subscribers.

In the exemplary embodiment in FIG. 1, internal clock generator 100 is configured for outputting a first clock signal $CLK_1$ derived from the clock generator signal $S_{TG}$. To derive the first clock signal $CLK_1$ from the clock generator signal $S_{TG}$, the clock generator frequency $f_{TG}$ of the clock generator signal $S_{TG}$ is multiplied or divided by whole numbers, for example. It is also possible to adapt the amplitude or a steepness of clock edges for the derivation. In the exemplary embodiment in FIG. 1, a first clock frequency $f_1$ of the first clock signal $CLK_1$ is equal to the data clock frequency $f_{SR}$ contained in the serial receive data stream $S_{SR}$ by closed-loop control of synchronization unit 121. Clock generator 100 is connected to parallel-to-serial converter 142 of transmit circuit 140 for outputting the first clock signal $CLK_1$ to parallel-to-serial converter 142, so that the conversion of the parallel transmit data $D_{PT}$ into serial transmit data $D_{ST}$ for the serial transmit data stream $S_{ST}$ is clocked by the first clock signal $CLK_1$. By clocking by means of first clock signal $CLK_1$, within the scope of the closed-loop control of synchronization unit 121, a transmit data clock frequency $f_{ST}$ in the transmit data stream $S_{ST}$ is controlled similar to the first frequency $f_1$ and similar to the data clock frequency $f_{SR}$ of the receive data stream $S_{SR}$.

In the exemplary embodiment of FIG. 1, clock generator 100 is configured for outputting a second clock signal $CLK_2$ derived from clock generator signal $S_{TG}$ to processing circuit 130. To derive the second clock signal $CLK_2$ from the clock generator signal $S_{TG}$, the clock generator frequency $f_{TG}$ of the clock generator signal $S_{TG}$ is multiplied or divided by whole numbers, for example. It is also possible to adapt the amplitude or a steepness of clock edges for the derivation. In a simple embodiment, a second frequency $f_2$ of the second clock signal $CLK_2$ corresponds to the first frequency $f_1$ of the first clock signal $CLK_1$. It is possible that the second clock signal $CLK_2$ corresponds to the first clock signal $CLK_1$. Alternatively, processing circuit 130 can be clocked higher, for example, so that more computing resources are available for processing. For example, the second frequency $f_2$ is an integer or non-integer multiple of the clock generator frequency $f_{TG}$. At least the processing of the parallel receive data $D_{PR}$ and/or of the parallel transmit data $D_{PT}$ is clocked by the second clock signal $CLK_2$.

In a simply designed subscriber 1, processing circuit 130 is sufficient to ensure the functions of subscriber 1. For example, processing circuit 130 is sufficient to read in digital input data at digital input connections or to output digital output data at output connections (not shown in FIG. 1). If subscriber 1 is to perform more complex functions, thus subscriber 1 has a programmable computing unit 190, for example, a processor such as a CPU or a microcontroller. Programmable computing unit 190 is connected to processing circuit 130 for the exchange of data. For example, the parallel receive data $D_{PR}$ and/or the parallel transmit data $D_{PT}$ can be exchanged between processing circuit 130 and programmable computing unit 190. Programmable computing unit 190 can be used, for example, for converting measured values or control values for the parallel receive data $D_{PR}$ and/or the parallel transmit data $D_{PT}$. In the exemplary embodiment in FIG. 1, programmable computing unit 190 is clocked by the second clock signal $CLK_2$, so that the clocking of programmable computing unit 190 also depends on the data clock frequency $f_{SR}$ contained in the serial receive data stream $S_{SR}$.

A further exemplary embodiment with a subscriber 1 in a wired data network 7 and two further subscribers 2, 3 is shown schematically in FIG. 2. In the exemplary embodiment shown in FIG. 2, reference is made to subscriber 1 in the middle between the further subscribers 2 and 3, wherein a serial receive data stream $S_{SR}$ is sent by further subscriber 3 and received by subscriber 1. Subscriber 1 sends a transmit data stream $S_{ST}$ to subscriber 2, wherein the transmit data stream $S_{ST}$ is received by further subscriber 2. In the exemplary embodiment of FIG. 2, serially transmitted data are passed on in the data stream in data packets by a plurality of communication-ready subscribers, wherein a data packet is generated only once and, for example, can be changed by each subscriber. A data packet can also be referred to as a telegram.

Subscriber 1 in the exemplary embodiment in FIG. 2 has a receive circuit 120 and a transmit circuit 140 and a clock generator 100 and a processing circuit 130. Optionally, in the exemplary embodiment in FIG. 2, subscriber 1 also has a clock circuit 180 and a programmable computing unit 190.

Receive circuit 120 of subscriber 1 is configured for receiving the serial receive data stream $S_{SR}$. Receive circuit 120 has an input circuit 129 which, for example, can have an amplifier or the like. Input circuit 129 is configured for outputting serial receive data $D_{SR}$. Receive circuit 120 has a serial-to-parallel converter 122 for converting serial receive data $D_{SR}$ of the serial receive data stream $S_{SR}$ into the parallel receive data $D_{PR}''$. Depending on the design of the parallel receive data $D_{PR}''$, receive circuit 120 has further subcircuits. In the exemplary embodiment in FIG. 2, the data are also encoded and scrambled (encrypted).

In the exemplary embodiment in FIG. 2, receive circuit 120 has a decoder 123 for decoding the parallel receive data $D_{PR}''$. In this regard, decoder 123 outputs decoded parallel receive data $D_{PR}'$. An input of decoder 123 is connected to an output of serial-to-parallel converter 122. An output of decoder 123 is connected to an input of a descrambler 124. In the exemplary embodiment in FIG. 2, decoder 123 is clocked by a first clock signal $CLK_1$. In the exemplary embodiment in FIG. 2, decoder 123 is designed as a 10b8b decoder. Alternatively, other decoders can be used for other encodings, such as, for example, the 64b66b code or Manchester. With the 8b10b code, the maximum length of the same bits (maximum run length) is limited to five by appropriate selection of the code words for pure data transmission; i.e., the level changes in a transition at the latest after five cycles. This enables a simple clock recovery from the serial receive data stream $S_{SR}$.

In the exemplary embodiment in FIG. 2, receive circuit 120 has a descrambler 124 for descrambling the parallel receive data $D_{PR}'$. An input of descrambler 124 is connected to the output of decoder 123. An output of descrambler 124 is connected to an input of a processing circuit 130. Descrambler 124 outputs descrambled parallel receive data $D_{PR}$. Descrambler 124 is clocked by the first clock signal $CLK_1$.

In the exemplary embodiment in FIG. 2, clock recovery is provided. The aim of clock recovery is to determine the transmit clock of the transmitter, therefore, of subscriber 3, from a received serial receive data stream $S_{SR}$ and thus, inter alia, to enable the time-accurate sampling of the serial receive data stream $S_{SR}$ and to align correctly in time (synchronize) the transmit data stream $S_{ST}$ transmitted in the direction of the further subscriber 2. The clock recovery is used on the receiver side of subscriber 1 to determine periodic sampling time points of the received serial receive data stream $S_{SR}$. The serial receive data stream $S_{SR}$ can be evaluated as precisely as possible by this time-accurate alignment; accordingly bit errors are rare. Due to the clock recovery, a parallel clock transmission using a separate clock transmission channel for synchronization can be dispensed with.

To be able to obtain the transmit clock having the data clock frequency $f_{SR}$ from the serial receive data stream $S_{SR}$, in the case, e.g., of bit-serial transmission, the serial receive data stream $S_{SR}$ must have sufficiently many signal edges, so that long sequences of '1' or '0' without transitions, i.e., without edges, should be avoided in the transmission. In the exemplary embodiment in FIG. 2, this is achieved, inter alia, by an 8b10b encoding. In FIG. 2, the serial receive data stream $S_{SR}$ is shown schematically with transitions TR, as well as the period $T_{SR}$ associated with the transitions over time t. The data clock frequency $f_{SR}$ corresponds to the reciprocal value of the period $T_{SR}$.

Receive circuit 120 has a synchronization unit 121 for synchronizing internal clock generator 100 to the data clock frequency $f_{SR}$ contained in the serial receive data stream $S_{SR}$. Synchronization unit 121, together with internal clock generator 100, forms a phase-locked loop PLL, so that the frequency $f_{TG}$ of internal clock generator 100 is controlled based on the data clock frequency $f_{SR}$ contained in the serial receive data stream $S_{SR}$. Or, in other words, synchronization unit 121 is configured for detecting the transitions TR in the received serial receive data stream $S_{SR}$ and for controlling the clock generator frequency $f_{TG}$ of internal clock generator 100 as a function of the detected transitions TR. For example, the frequency $f_{TG}$ of internal clock generator 100 corresponds to the data clock frequency $f_{SR}$ or the frequency $f_{TG}$ of internal clock generator 100 is an integer fraction of the data clock frequency $f_{SR}$ or the frequency $f_{TG}$ of internal clock generator 100 is an integral multiple of the data clock frequency $f_{SR}$.

Internal clock generator 100 in the exemplary embodiment in FIG. 2 is used for generating a clock generator signal $S_{TG}$ having a clock generator frequency $f_{TG}$ for subscriber 1 itself. In the exemplary embodiment in FIG. 2, the entire subscriber 1 is clocked based on the clock generator signal $S_{TG}$, so that a further clock generator is not provided for circuit parts of subscriber 1. Clock generator 100 has a crystal oscillator 101 having a voltage-trimmable clock generator frequency $f_{TG}$. Such crystal oscillators are also called VCXO (Voltage Controlled (X)crystal Oscillator), TCVCXO (Temperature Compensated Voltage Controlled (X)Crystal Oscillator), or OCVCXO (Oven Controlled Voltage Controlled (X)Crystal Oscillator) and, inter alia, stand for temperature-compensated or heated adjustable crystal oscillators. The clock generator frequency $f_{TG}$ of clock generator 100 is advantageously adjustable only within a range of less than 1% of the clock generator frequency $f_{TG}$. Preferably the clock generator frequency can be changed only on the order of 100 ppm. In the exemplary embodiment in FIG. 2, crystal oscillator 101 is part of a phase-locked loop PLL, wherein the phase-locked loop PLL comprises at least parts of clock generator 100 and synchronization unit 121.

Internal clock generator 100 is configured for outputting a first clock signal $CLK_1$, derived from the clock generator signal $S_{TG}$, to transmit circuit 140. The first clock signal $CLK_1$ has the first frequency $f_1$. For deriving the first clock signal $CLK_1$, internal clock generator 100 has, for example, a further phase-locked loop (not shown), by means of which the clock generator frequency $f_{TG}$ is multiplied by a whole number in order to obtain the first clock frequency $f_1$. In the exemplary embodiment in FIG. 2, internal clock generator 100 is designed to control the first clock frequency $f_1$ of the first clock signal $CLK_1$ such that the first clock frequency $f_1$ is equal to the data clock frequency $f_{SR}$ contained in the serial receive data stream $S_{SR}$.

Clock generator 100 in FIG. 2 is additionally configured for outputting a second clock signal $CLK_2$, derived from the clock generator signal $S_{TG}$, at least to processing circuit 130, so that a processing of the parallel receive data $D_{PR}$ and/or the parallel transmit data $D_{PT}$ is clocked by the second clock signal $CLK_2$. Clock generator 100 is configured to output the second clock signal $CLK_2$ with a second clock frequency $f_2$, wherein by closed-loop control the second clock frequency $f_2$ is, for example, an integer multiple of the data clock frequency $f_{SR}$ contained in the serial receive data stream $S_{SR}$ or an integer fraction of the data clock frequency $f_{SR}$ contained in the serial receive data stream $S_{SR}$. In the exemplary embodiment shown in FIG. 2, the second clock signal $CLK_2$, for example, is equal to the first clock signal $CLK_1$; therefore, the first frequency $f_1$ is also equal to the second frequency $f_2$.

A processing circuit 130 for inputting the parallel receive data $D_{PR}$ and for outputting the parallel transmit data $D_{PT}$ is shown in the exemplary embodiment in FIG. 2. Accordingly, processing circuit 130 is connected to receive circuit 120 and transmit circuit 140. For the processing, processing circuit 130 is configured to forward the parallel receive data $D_{PR}$ in order to output the parallel transmit data $D_{PT}$ based on the parallel receive data $D_{PR}$ to transmit circuit 140 after a predetermined number of cycles of the second clock signal $CLK_2$. As a result, the number of cycles of the second clock signal $CLK_2$ for all parallel receive data $D_{PR}$ is always the same and thus deterministically delayed. Because all subcircuits 129, 122, 123, 124, 133, 144, 143, 142, 149 in the transmission chain between the input of the serial receive data stream $S_{SR}$ and the serial transmit data stream $S_{ST}$ cause no delay or a delay due to the first clock signal $CLK_1$ and/or the second clock signal $CLK_2$, the total delay for the data stream $S_{SR}$, $S_{ST}$ is predetermined by subscriber 1 and is constant and thus deterministic.

In the exemplary embodiment in FIG. 2, processing circuit 130 has a manipulation circuit 133 for the bit-granular changing of individual bits or all bits of the parallel receive data $D_{PR}$. The changed parallel receive data $D_{PR}$ are the parallel transmit data $D_{PT}$. Processing circuit 130 has a digital logic 132 to control the change. Digital logic 132 is connected to manipulation circuit 133 and to a memory 131. The parallel receive data $D_{PR}$ can be changed but not stored temporarily by manipulation circuit 133, so that if the parallel receive data $D_{PR}$ are present on the input side, the parallel transmit data $D_{PT}$ are output at the same time. The enable signal EN2 for the parallel transmit data $D_{PT}$ is delayed, however, by the predetermined number of cycles of the second clock signal $CLK_2$ compared with the input of the parallel receive data $D_{PR}$. For example, the forwarding of the parallel transmit data $D_{PT}$ is constantly delayed by the enable signal EN2 by two cycles of the second clock signal $CLK_2$.

Processing of the parallel receive data $D_{PR}$ can consist of executing a bit operation on the received parallel receive data $D_{PR}$. In this case, it can also be said that the processing is bit-granular. The bit operations that can be carried out are based, for example, on a reduced set of instructions that subscriber 1 can execute, for example, "SKIP," "MOVE," "NEGATION," "INCREMENT," "AND," and "OR," or a combination thereof. Processing circuit 130 has a memory area 131*c* in memory 130 for an instruction list IL. Memory 131 and memory area 131*c* are shown schematically in the exemplary embodiment in FIG. 2*a*. Processing circuit 130 is configured to execute the processing based on the instructions I1, I2, I3, I4, I5 contained in the instruction list IL, wherein the reading out of the instructions I1, I2, I3, I4, I5 from the instruction list IL is clocked by means of the second clock signal $CLK_2$.

Which bit operations are executed in which order is stored in subscriber 1 with the aid of instruction list IL. An instruction list IL can be sent to the respective subscriber 1 in advance in a first data packet and represents the programming of subscriber 1. This instruction list IL contains for each part, e.g., an 8-bit symbol, of the parallel receive data $D_{PR}$ or for each bit of the parallel receive data $D_{PR}$ at least one instruction I1, I2, I3, I4, I5, i.e., an operation that is to be executed with the corresponding bit. In this regard, there can be a fixed number or a predetermined number of instructions I1, I2, I3, I4, I5 in the instruction list IL for each symbol. In other words, subscriber 1 executes a certain number of instructions, I1, I2, I3, I4, I5 per symbol in the time available to it for processing. If, for example, subscriber 1 is not to perform any processing with the bit, the corresponding instruction list IL for the corresponding bit can be empty or have a "SKIP" instruction. The instruction list IL can also have the number of repetitions for a specific instruction I1, I2, I3, I4, I5. For example, the instruction list IL can contain a "SKIP" instruction with the indication to repeat this twice. In this case, the next two bits are then not processed but skipped. Parameters can also be specified for the instructions "MOVE," "NEGATION," "INCREMENT," "AND," and "OR."

The instructions I1, I2, I3, I4, I5, accordingly control manipulation circuit 133 which, e.g., sets and/or deletes a number of bits in a symbol of the parallel receive data $D_{PR}$. It is also possible that a number of bits of the parallel receive data $D_{PR}$ is incremented in order to add another value to a value in the parallel receive data $D_{PR}$. It is useful here to store temporarily an overflow bit from the parallel receive data $D_{PR}$ in the incrementation. It is also possible to combine the setting and/or deleting and/or incrementing with one another by means of manipulation circuit 133.

Processing circuit 130 can execute, for example, a series of further processing operations by means of the instructions I1, I2, I3, I4, I5. For example, for processing, processing circuit 130 is configured to store the parallel receive data $D_{PR}$ in a memory area 131*a* for an evaluation. Alternatively or in combination, it is possible to read out at least partially the parallel transmit data $D_{PT}$ from a memory area 131*b* in order to output the read-out data as parallel transmit data $D_{PT}$ to transmit circuit 140. Alternatively or in combination, it is possible to change a number of bit values of the parallel receive data $D_{PR}$ in order to output the parallel receive data $D_{PR}$ with the change as parallel transmit data $D_{PT}$ to transmit circuit 140.

In the exemplary embodiment in FIG. 2, processing circuit 130 is clocked by the second clock signal $CLK_2$. Processing circuit 130 is configured to output the parallel transmit data $D_{PT}$ after a predetermined number of cycles of the second clock signal $CLK_2$ after inputting of the parallel receive data $D_{PR}$. Thus, the delay by processing circuit 130 is deterministic in time and independent of a program run in a computing unit. Nevertheless, it is possible to execute a processing of data during the specified number of cycles and, e.g., to add a further value to a received value or to subtract it from said value without the parallel receive data $D_{PR}$ having to be stored temporarily in a memory before processing.

The subscriber in the exemplary embodiment in FIG. 2 has transmit circuit 140 for sending a serial transmit data stream $S_{ST}$. Transmit circuit 140 has a scrambler 144 for scrambling the parallel transmit data $D_{PT}$. Scrambler 144 is clocked by the first clock signal $CLK_1$. Scrambler 144 uses linear feedback shift registers or fixed tables to invert the parallel transmit data $D_{PT}$ by means of a relatively simple algorithm. The inversion is done by descrambler 124. Transmit circuit 140 also has an encoder 143 for encoding the parallel transmit data $D_{PT}'$ and for outputting encoded parallel transmit data $D_{PT}''$. Encoder 143 is, for example, an 8b10b encoder. Encoder 143 is clocked by the first clock signal $CLK_1$. Transmit circuit 140 has a parallel-to-serial converter 142 for converting the parallel transmit data $D_{PT}''$, output by encoder 143, into serial transmit data $D_{ST}$, wherein the transmit data $D_{ST}$ are inserted into the transmit data stream $S_{ST}$. Transmit circuit 140 also has an output circuit 149, which is also clocked by means of the first clock signal $CLK_1$. Output circuit 149 has, for example, a last register in the transmission chain, said register that is clocked by the first clock signal $CLK_1$, so that the serial transmit data $D_{ST}$ is output with exactly the same regulated frequency as the data clock frequency $f_{SR}$ of the receive data stream $S_{SR}$.

In the exemplary embodiment in FIG. 2, subscriber 1 also has a programmable computing unit 190 in order to run a subscriber-specific program. The programs in programmable processing unit 190 run synchronously with the processing of the parallel receive data $D_{PR}$ and the parallel transmit data $D_{PT}$. In this regard, programmable computing unit 190 is clocked by the second clock signal $CLK_2$. Accordingly, the processing in higher protocol layers is also ideally deterministic.

In the exemplary embodiment in FIG. 2, subscriber 1 also has a clock circuit 180. Clock circuit 180 is also referred to as clock 180 below. Clock circuit 180 is used for timing and/or acquisition. Clock circuit 180 is, for example, part of a distributed clock system. For example, a reading-in time of, e.g., sensor data can be determined by means of clock circuit 180, or an output of control data, e.g., for controlling an actuator, can be set to a specific point in time based on a clock time of clock circuit 180. This is of interest, for example, when multiple subscribers 1, 2, 3 control a process and are to acquire a process image at a predetermined common point in time. In the exemplary embodiment in FIG. 2, clock circuit 180 is likewise clocked by the first clock signal $CLK_1$ or the second clock signal $CLK_2$, so that clock circuit 180 runs faster or slower depending on the data clock frequency $f_{SR}$. However, by controlling the control loop PLL, clock 180 runs accordingly to a previous subscriber 3 from which the serial receive data stream $S_{SR}$ is received by subscriber 1 by controlling the control loop PLL.

Investigations by the applicant have shown that subscribers 1, 2 that can work with one another very precisely in time can be formed by designing subscriber 1 in the exemplary embodiment of FIG. 2 with a clock recovery and clocked output of the serial transmit data $D_{ST}$ with the same frequency, as well as with the particular clock-controlled processing with the same frequency.

A system with subscribers 1, 2, 3, which are connected via a local bus 7, and with subscribers 3, 4, which are connected to one another via a higher-level bus 6, is shown schematically in FIG. 3. The higher-level bus 6 can be designed as a fieldbus. Subscriber 3, which is connected to both fieldbus 6 and local bus 7, acts as a gateway and can also be referred to as a coupler or head station or local bus master.

The system according to the exemplary embodiment of FIG. 3 is intended to achieve that lower-level clocks 180, 280 are synchronized with a higher-level clock 370, 380 in order to provide a distributed, synchronized clock time in the system with spatially separated subscribers 1, 2, 3. This can also be referred to as a distributed clock.

A first subscriber 1 and a second subscriber 2 are connected to coupler 3 via local bus 7. First subscriber 1 has an internal clock generator 100 for generating a clock generator signal having a clock generator frequency for first subscriber 1. Also, first subscriber 1 has a receive circuit 120 for receiving a serial receive data stream and a transmit circuit 140 for transmitting a serial transmit data stream. Receive circuit 120 has a serial-to-parallel converter (not shown in FIG. 3) for converting serial receive data of the serial receive data stream into parallel receive data. Transmit circuit 140 has a parallel-to-serial converter (not shown in FIG. 3) for converting the parallel transmit data into serial transmit data of the transmit data stream.

Accordingly, second subscriber 2 of local bus 7 also has a clock generator, a receive circuit, and a transmit circuit. However, these are not shown in FIG. 3.

For communication via local bus 7, coupler 3 has a local bus-side transmit/receive circuit 340 and for communication via fieldbus 6, it has a fieldbus-side transmit/receive circuit 320. In the exemplary embodiment of FIG. 3, the higher-level clock 380 can be synchronized within the local bus system to another higher-level clock 480.

Clock 380 of coupler 3 is synchronized with clock 480 of a higher-level controller 480, e.g., a PLC (programmable logic controller), by means of a closed-loop control. In the exemplary embodiment in FIG. 3, coupler 3 has a control loop for clock synchronization. Local clock 385 is provided in this control loop, a clock which outputs the clock time $t_{SM}$ based on the speed manipulated variable. The actual time $t_{SM}$ is acquired at the time when message 60 is received by means of holding element 382 and temporarily stored. The target time $TS_{FB}$ is contained in message 60; a local error is determined from the actual time and the target time $TS_{FB}$ by difference element 383 and input at the input of PI controller 384.

A reference clock is used to cyclically determine the local error, which is then to be eliminated with a suitable controller 384. For this purpose, controller 384 can accordingly change the speed of clock 380 to be synchronized as a manipulated variable in order to control the local error to zero. The reference clock is realized by the event "receiving of a specific communication message" 60. Message 60 contains, for example, the target value $TS_{FB}$ for the time that is used to calculate the local error.

For control, a PI controller 384 is used in coupler 3 in the exemplary embodiment of FIG. 3; it changes the speed of clock circuit 385 so that in the controlled state, clock 380 of coupler 3 runs as rapidly as the higher-level clock 480 of PLC 4 (therefore, the drift error is controlled to zero), and that clock 380 of coupler 3 supplies the same time clock time $t_{SM}$ as the higher-level clock 480 of PLC 4 (therefore, the offset error is controlled to zero). In this case, the drift error is a special feature. This drift error describes the speed difference between clocks 380 and 480 to be synchronized. The speed error of both clocks 380, 480 is due to the slightly different frequencies of clock generators 300, 400 used in each subscriber 3, 4, wherein crystal oscillators or MEMS or other oscillators of clock generator 300, 400 have slightly different frequencies.

The drift represents the first derivative of the local error. I.e., if the local error increases continuously, then the drift is not zero. If the local error is constant, then the drift is zero and there only is only an offset error. The offset error is also due to the fact that even two clocks running at exactly the same speed must be synchronized at least once. The manipulated variable which PI controller 384 of coupler 3 influences in the exemplary embodiment in FIG. 3 is the speed of clock circuit 385. An offset error can be corrected thereby with an artificial "drift error." I.e., controller 384 changes the speed of clock circuit 385 for a limited time in order to correct an offset error.

A plurality of sampling cycles are used in the control loop in order to produce synchronization with the higher-level clock 480. PI controller 384 is designed to be slow, because the local error is often constrained by various disturbance variables, such as, for example, noise, sporadic outliers, and discretization errors. Due to the slow design of PI controller 384, the disturbance variables only have a limited effect on the clock time $t_{SM}$ to be synchronized. With slow control, the synchronization (locking) takes a correspondingly long time so that the disturbance variables only have a very limited effect.

The locking process can be shortened in that PI controller 384 is sampled more frequently, which, however, signifies an increased communication effort, because more messages 60 must be transmitted via bus 6. Message 60 can also be referred to as a synchronization telegram. In addition, the load on the CPU is higher if the control loop is implemented in a software program. Alternatively, PI controller 384 could also be dimensioned "faster," as a result of which, however, the disturbance variables have a greater effect on the residual error in the synchronization.

When a PI controller 384 is used, a PT2 behavior or a higher-order transfer behavior results for the closed control loop as the transfer function. A system capable of oscillation can result; i.e., the step response does not result in a local error that asymptotically approaches zero, but rather the step response is similar to a damped oscillation, the amplitude of which asymptotically approaches zero. To determine whether clock 380 is synchronized or not, the local error is checked to see whether it lies within a window around zero. In the case of a step response that resembles a damped oscillation, this window can be entered and exited again a number of times during the synchronization process before the amplitude has become so small that the residual error lies permanently within the window. Accordingly, the synchronization process is completed when the residual error has not left the window for a certain period of time.

In the exemplary embodiment in FIG. 3, a clock signal $CLK_M$ of clock generator 300 of coupler 3 lies both at a clock input 381 of clock 380 with a control loop and also or optionally at an input 371 of an uncontrolled clock 370. Both clocks 380 and 370 are shown by way of example only as a function and can be generated by the same circuit. Uncontrolled clock 370 runs clocked exactly with clock generator 300 and can be used when no synchronization to clock 480 of PLC 4 is required. Also based on the clock signal $CLK_M$ of clock generator 300 of coupler 3, transmit/receive circuit 340 of coupler 3 is clocked for communication via local bus 7. Data packets, e.g., synchronization telegram 70, are output clocked exactly with the clock signal $CLK_M$.

Use is made of the fact that a synchronization unit 121 of a first subscriber 1 is used in the physical layer PHY. Coupler 3 is designed, for example, as the master of local bus 7 and first subscriber 1 and a second subscriber 2 are designed, for example, as a slave of local bus 7. However, the invention is not limited to master/slave bus systems; thus, the invention can alternatively be used for multiple access (Carrier Sense Multiple Access—CSMA) or a point-to-point connection. Synchronization unit 121 can also be referred to as a CDR (Clock and Data Recovery). Synchronization unit 121 of first subscriber 1 is configured for detecting transitions in the received serial receive data stream. The receive data stream can be received by receive circuit 120 of first subscriber 1 from transmit/receive circuit 340 of coupler 3. Synchronization unit 121 is configured to control the clock generator frequency of internal clock 100 of first subscriber 1 as a function of the transitions detected in the receive data stream.

Internal clock generator 100 of first subscriber 1 is configured for outputting a first clock signal $CLK_1$, derived from the clock generator signal, to a clock circuit 180. A first clock frequency of the first clock signal $CLK_1$ is equal to the data clock frequency contained in the serial receive data stream and thus equal to the frequency of the clock signal $CLK_M$ of clock 300 of coupler 3 by the closed-loop control of synchronization unit 121. The clock signal $CLK_M$ of clock generator 300 of coupler 3 can also be referred to as the master clock signal $CLK_M$. Accordingly, the clocks 370, 380, 180, 280 in the local bus system are clocked with clock signals $CLK_M$, $CLK_1$ with the same clock frequency, wherein the clock frequencies differ only slightly from one another only until the control is locked by synchronization unit 121 at the PHY level. The clock frequencies preferably deviate from one another by a maximum of +/−100 to 200 ppm until locking of the control by synchronization unit 121 at the PHY level. For the control loop of synchronization unit 121 in the physical layer PHY, the sampling rate of the controller is several powers of ten higher than the sampling rate for the control in clock 380. Transient processes of the control by synchronization unit 121 in the physical layer PHY are therefore completed in a fraction of the time that is required for the transient process of the control loop of clock 380 of coupler 3 with PI controller 384.

If the clock signal $CLK_M$ and $CLK_1$ synchronized by synchronization unit 121 by means of CDR is used to operate the higher-level clock 380, 370 of coupler 3 and lower-level clocks 180, 280 of subscribers 100, 200, then the drift error is equal to zero. A simple P controller in local clock 180, 280 is then sufficient for synchronizing the offset error. The P controller can be omitted completely if, as in the exemplary embodiment in FIG. 3, message 70 can be transmitted deterministically and advantageously without jitter in local bus 7. Deterministic in this case means that each message 70 that is transmitted via local bus 7 requires a fixed, unchangeable number of cycles, for example, 16.5 cycles, or a fixed, unchangeable time period, for example, 33 μs, for transmission from coupler 3 to first subscriber 1 (runtime). The transmission from first subscriber 1 to second subscriber 2 and possibly to each further subscriber (not shown) of bus 7 is also deterministic. In the case of the deterministic transmission, clock 180 of first subscriber 1 is configured to set its time $t_{S1}$ to the time value $TS_{LB1}$ contained in message 70 or to set a time value derived therefrom.

An offset can also be added to the time value $TS_{LB1}$ contained in message 70, e.g., to compensate for the transit time of message 70 via the physical layer PHY. For example, the time value $TS_{LB1}$ is based on the time $t_{SM}$ of coupler 3 and the transit time required for the transmission of message 70. Alternatively, the derived time value is calculated based on the transmitted time value $TS_{LB1}$ and a transit time known to first subscriber 1 that is required for transmitting message 70. First subscriber 1 has a processing circuit 130 for parallel data processing, wherein processing circuit 130 is configured to read out the time value $TS_{LB1}$ from message 70 and to forward it to clock 180. Furthermore, processing circuit 130 is configured to change the time value $TS_{LB1}$ possibly to a different time value $TS_{LB2}$, which is transmitted to clock 280 of the following second subscriber 2 by means of transmit circuit 140 via bus 7.

The advantage that one of the clock times $t_M$ or $t_{SM}$ of coupler 3 is almost perfectly synchronized with clock times $t_{S1}$, $t_{S2}$ of subscriber 1, 2 is achieved by the exemplary embodiment in FIG. 3. Thus, clocks 180, 280 of subscribers 1, 2 and the master clock 370 or 380 used of coupler 3 do not diverge from one another; therefore, they do not exhibit any drift that would have to be corrected. In the exemplary embodiment in FIG. 3, both subscribers 1 and 2 each have a computing unit 190 and 290, for example, a microcontroller, and both subscribers 1 and 2 each have an interface 150, 250, for example, cable connection contacts, for external connection of an actuator 512, 522 and/or sensor 511, 521 or the like. Clocks 180, 280 of subscribers 1, 2 can also be implemented as software in computing unit 190, 290 of the respective subscriber 1, 2. Due to the almost perfect synchronization of clocks 180 and 280 of first subscriber 1 or second subscriber 2, the sensor values of sensors 511, 512 [sic; 512 should be 521] can be acquired at exactly the same time and/or actuators 512, 522 within subscribers 1, 2 of bus 7 can be controlled at exactly the same time.

A message 70 for transmission via bus 7 is shown schematically in FIG. 3a. Message 70 has a header H, a time increment TV (e.g., 28 bits), a time value $TS_{LB1}$ (e.g., 64 bit), and a check value CRC. The time increment TV defines the speed of the higher-level clock 380 of coupler 3. It is achieved thereby that the lower-level clocks 180, 280 of subscribers 1, 2 use the same time increment and always run parallel to the higher-level clock 380 of coupler 3. In this way, the higher-level clock 380 of coupler 3 can be synchronized with PI controller 384 to the higher-level clock 480 of control unit 4 (PLC) connected via fieldbus 6 by means of the control loop of coupler 3 and all lower-level clocks 180, 280 follow it and thus the synchronization of clock 380 of coupler 3 without additional synchronization of subscribers 1, 2 outside the physical layer PHY being required. A control loop within clock 180, 280 of a subscriber 1, 2, i.e., outside the physical layer PHY, can be completely omitted; subscribers 1, 2 follow the clock of coupler 3 slavishly, almost without delay. This greatly simplifies the implementation of a distributed clock system. The requirement for logic and software resources is significantly reduced in the exemplary embodiment in FIG. 3 compared with conventional solutions.

Subscribers 1, 2 of bus 7 are practically ready for operation after startup due to the fast clock synchronization. The complete clock synchronization of subscribers 1, 2 is already achieved with first message 70, even if clock 380 of coupler 3 is still in the synchronization phase before the locking. Coupler 3 is configured to send a new message 70 when coupler 3 determines that a new subscriber X (not shown) has been added, or when an existing subscriber 1, 2 undergoes a hardware reset or when clock 380 of coupler 3 is unsteady to synchronize by setting to a completely new clock time $t_{PLC}$ of PLC 4, or when PI controller 384 has calculated a new speed value TV.

In the exemplary embodiment in FIG. 3, the residual error between the clock times $t_{SM}$ of coupler 3 and the clock times $t_{S1}$, $t_{S2}$ of subscriber 1, 2 is smaller than an error which could be achieved with a separate PI controller in each subscriber 1, 2. The largest proportion of this very small residual error is due to the (possibly not exactly known) transit times on bus 7 and to the measurement and compensation of these transit times on bus 7. In contrast, neither noise nor outliers contribute to the residual error.

In the exemplary embodiment in FIG. 3, the solution is also shown that a clock 370 of coupler 3 need not be synchronized with a higher-level clock and is accordingly clocked exactly by clock generator 300 of coupler 3, for example, by means of a crystal oscillator. In this case, the transmission of the time increment TV can be omitted because in any case it is the same for all subscribers 1, 2, 3 of bus 7. It is also possible to transmit the time increment TV only once, because it is then constant. In this case, message 70 also does not have to be transmitted cyclically. For example, an event-dependent transmission is sufficient, e.g., when adding a new subscriber. In the exemplary embodiment in FIG. 3, both clocks 370, 380 can be selected alternatively by a selection circuit 390, for example, a multiplexer.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system comprising:
a head station having a fieldbus-side transmit/receive circuit to communicate via a fieldbus, having a local bus-side transmit/receive circuit to communicate via a local bus, having a clock with a control loop for clock synchronization to a higher-level clock connected via the fieldbus; and
at least one subscriber connectable to the head station via the local bus, the subscriber having an internal clock generator to generate a clock generator signal, having a clock generator frequency for the subscriber, having a receive circuit for receiving a serial receive data stream, having a processing circuit for inputting parallel receive data and for outputting parallel transmit data, and having a transmit circuit for transmitting a serial transmit data stream,
wherein the receive circuit of the subscriber has a serial-to-parallel converter for converting serial receive data of the serial receive data stream into the parallel receive data,
wherein the receive circuit of the subscriber has a synchronization circuit for synchronizing the internal clock generator to the data clock frequency contained in the serial receive data stream,
wherein the synchronization circuit of the subscriber is configured to detect transitions in the received serial receive data stream and to control the clock generator frequency of the internal clock generator as a function of the detected transitions,
wherein the transmit circuit of the subscriber has a parallel-to-serial converter for converting the parallel transmit data into serial transmit data of the transmit data stream,
wherein the internal clock generator of the subscriber is configured to output a first clock signal derived from the clock generator signal to the transmit circuit so that the conversion of the parallel transmit data into serial transmit data for the serial transmit data stream is clocked by the first clock signal, wherein a first clock frequency of the first clock signal is equal to the data clock frequency contained in the serial receive data stream by closed-loop control, wherein the clock generator of the subscriber is configured for outputting a second clock signal derived from the clock generator signal to the processing circuit so that a processing of the parallel receive data or the parallel transmit data is clocked by the second clock signal, wherein the subscriber has a clock circuit for outputting a clock time, wherein a clock cycle of the clock circuit is derived from the clock generator signal having the clock generator frequency so that by closed-loop control, the clock cycle is equal to or an especially integer fraction or an especially integer multiple of the data clock frequency contained in the serial receive data stream, and wherein the processing circuit is configured to determine a current time value or a current time increment value from the clock circuit and to write it into the parallel transmit data or to read a time value or a time increment value from the parallel receive data.

2. A subscriber of a wired data network, in particular of a local bus system, the subscriber comprising:

an internal clock generator to generate a clock generator signal having a clock generator frequency for the subscriber;

a receive circuit to receive a serial receive data stream;

a processing circuit to input parallel receive data and output parallel transmit data; and a transmit circuit to transmit a serial transmit data stream, wherein the receive circuit has a serial-to-parallel converter for converting serial receive data of the serial receive data stream into the parallel receive data, wherein the receive circuit has a synchronization circuit for synchronizing the internal clock generator to the data clock frequency contained in the serial receive data stream, wherein the synchronization circuit is configured for detecting transitions in the received serial receive data stream and for controlling the clock generator frequency of the internal clock generator as a function of the detected transitions, wherein the transmit circuit has a parallel-to-serial converter for converting the parallel transmit data into serial transmit data of the transmit data stream, wherein the internal clock generator is configured for outputting a first clock signal derived from the clock generator signal to the transmit circuit so that the conversion of the parallel transmit data into serial transmit data for the serial transmit data stream is clocked by the first clock signal, wherein a first clock frequency of the first clock signal is equal to the data clock frequency contained in the serial receive data stream by closed-loop control, wherein the clock generator is configured for outputting a second clock signal derived from the clock generator signal to the processing circuit so that a processing of the parallel receive data or the parallel transmit data is clocked by the second clock signal, and wherein the processing circuit is configured to determine a current time value or a current time increment value from the clock circuit and to write it into the parallel transmit data or to read a time value or a time increment value from the parallel receive data.

3. The subscriber according to claim 2, wherein, for the processing, the processing circuit is configured to forward the parallel receive data in order to output the parallel transmit data based on the parallel receive data to the transmit circuit after a predetermined number of cycles of the second clock signal.

4. The subscriber according to claim 3, wherein for the processing, the processing circuit is configured: to store the parallel receive data at least partially in a memory area for an evaluation; and/or to read out the parallel transmit data at least partially from a memory area in order to output the read-out parallel transmit data to the transmit circuit; and/or to change a number of bit values of the parallel receive data in order to output the parallel receive data with the change as parallel transmit data to the transmit circuit.

5. The subscriber according to claim 2, wherein the clock generator is configured to output the second clock signal having a second clock frequency, wherein by closed-loop control, the second clock frequency is equal to or an integer multiple of the data clock frequency contained in the serial receive data stream.

6. The subscriber according to claim 2, wherein by closed-loop control, the clock generator frequency of the clock generator is equal to or an integer fraction or an integer multiple of the data clock frequency contained in the serial receive data stream.

7. The subscriber according to claim 2, wherein the processing circuit has a memory area for an instruction list, wherein the processing circuit is configured to execute the processing based on instructions contained in the instruction list, and wherein the processing circuit is configured to clock a reading out of the instructions from the instruction list via the second clock signal.

8. The subscriber according to claim 2, wherein the clock generator has a crystal oscillator having a voltage-trimmable clock generator frequency, and wherein the crystal oscillator is part of a phase-locked loop.

9. The subscriber according to claim 2, wherein the clock generator frequency of the clock generator is adjustable only within a range of less than 1% of the clock generator frequency.

10. The subscriber according to claim 2, wherein the receive circuit has a decoder for decoding the parallel receive data, the decoder being clocked by the first clock signal, and/or wherein the transmit circuit has an encoder for encoding the parallel transmit data, the encoder being clocked by the first clock signal.

11. The subscriber according to claim 2, wherein the receive circuit has a descrambler for descrambling the parallel receive data, the descrambler being clocked by the first clock signal, and/or wherein the transmit circuit has a scrambler for scrambling the parallel transmit data, the scrambler being clocked by the first clock signal.

12. The subscriber according to claim 2, wherein the processing circuit is configured to output the parallel transmit data after a predetermined number of cycles of the second clock signal after the inputting of the parallel receive data.

13. The subscriber according to claim 2, wherein the processing circuit is configured for synchronizing the clock time in that the processing circuit is configured to evaluate a time value from the parallel receive data and to adjust the clock time of the clock circuit based on the time value.

14. The subscriber according to claim 2, wherein the processing circuit is configured to evaluate a time increment value from the parallel receive data and to set a clock time increment of the clock circuit based on the time increment value.

15. The subscriber according to claim 2, wherein the clock circuit is designed so that the clock time is not controlled by a clock time controller of the clock circuit.

* * * * *